United States Patent
Lopez Mendez et al.

(10) Patent No.: US 11,682,368 B1
(45) Date of Patent: Jun. 20, 2023

(54) METHOD OF OPERATING A MOBILE DEVICE

(71) Applicant: Arm Limited, Cambridge (GB)

(72) Inventors: Roberto Lopez Mendez, Cambridge (GB); Daren Croxford, Swaffham Prior (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/848,565

(22) Filed: Jun. 24, 2022

(51) Int. Cl.
*G09G 5/391* (2006.01)
*G06F 3/01* (2006.01)
*G06T 7/593* (2017.01)
*G06F 1/3212* (2019.01)
*G06T 7/521* (2017.01)

(52) U.S. Cl.
CPC .......... *G09G 5/391* (2013.01); *G06F 1/3212* (2013.01); *G06F 3/013* (2013.01); *G06T 7/521* (2017.01); *G06T 7/593* (2017.01); *G09G 2360/144* (2013.01)

(58) Field of Classification Search
CPC ...................................................... G06F 3/013
See application file for complete search history.

(56) References Cited

U.S. PATENT DOCUMENTS

| | | | |
|---|---|---|---|
| 2015/0149956 A1* | 5/2015 | Kempinski | G06F 3/0485 715/784 |
| 2021/0229627 A1* | 7/2021 | Salter | B60R 25/24 |
| 2022/0121316 A1* | 4/2022 | Chen | G06F 3/04186 |
| 2022/0150567 A1* | 5/2022 | Varan | A61B 5/6821 |

* cited by examiner

*Primary Examiner* — Gustavo Polo
(74) *Attorney, Agent, or Firm* — Nixon & Vanderhye P.C.

(57) ABSTRACT

A method of operating a mobile device, the method comprising: identifying a first image parameter for an image to be displayed on a display of the mobile device; determining a distance between the display of the mobile device and a user of the mobile device; modifying the first image parameter dependent upon the distance between the display of the mobile device and the user of the mobile device; and displaying an image on the display using the modified first image parameter.

19 Claims, 6 Drawing Sheets

METHOD OF OPERATING A MOBILE DEVICE

The present techniques generally relate to a mobile device and methods of operating a mobile device. More particularly, but not exclusively, the techniques relate to a mobile device comprising a screen for user interaction and methods of operating a mobile device comprising a screen for user interaction.

Devices which are mobile rely on power from a local power source to operate. Such a local power source may be an inbuilt battery with a finite amount of power. Such a local power source can be charged at a fixed location, and the mobile device can then used by a user away from the fixed location, without connection to any external power source for a period of time.

Furthermore, displays on mobile devices are generally becoming larger and brighter and generally operate at increasingly higher resolutions thereby requiring a greater amount of power to operate. The power sources for such mobile devices may not be capable of providing the increase in power capacity required to operate mobile devices with such larger, brighter screens with higher resolutions whilst maintaining a user acceptable battery life, without power management which may impact on the functionality of the mobile device.

It would therefore be desirable to provide an alternative mobile device and method for operating a mobile device.

According to a first aspect of the present technique, there is provided a method of operating a mobile device, the method comprising: identifying a first image parameter for an image to be displayed on a display of the mobile device; determining a distance between the display of the mobile device and a user of the mobile device; modifying the first image parameter dependent upon the distance between the display of the mobile device and the user of the mobile device; and displaying an image on the display using the modified first image parameter.

According to a second aspect of the present technique, there is provided a mobile device comprising: a display; and a processor, wherein the processor is configured to: identify a first image parameter for an image to be displayed on the display of the mobile device; determine a distance between the display of the mobile device and a user of the mobile device; modify the first image parameter dependent upon the distance between the display of the mobile device and the user of the mobile device; and display an image on the display using the modified first image parameter.

Embodiments will now be described with reference to the accompanying figures of which:

Reference is made in the following detailed description to the accompanying drawings, wherein like numerals may designate like parts throughout that are corresponding and/or analogous. It is to be understood that other embodiments may be utilized. Furthermore, structural, procedural and/or other changes may be made without departing from claimed subject-matter.

The accompanying drawings and following description provide details of the present techniques for operating a mobile device.

Figure 1:
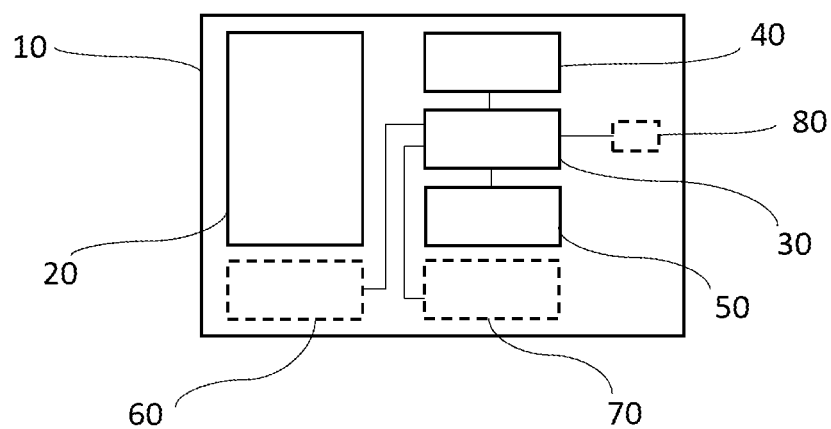
FIG. 1 illustrates a schematic diagram of an apparatus according to various examples.

FIG. 1 illustrates a schematic diagram of an apparatus 10, where the apparatus 10 may be in the form of a mobile device 10 comprising a display means in the form of a screen or display 20, which display 20 may be required to be controlled in order to optimise the power consumption of the mobile device 10.

The mobile device 10 may, for example, be a mobile phone, a smart watch, a tablet, or a laptop computer. Mobile phones have increased in display size in recent years and some mobile phones comprise rollable or folding displays that allow the mobile phone to have a smaller rolled or folded form for transportation whilst providing a large visual display 20 when unrolled or unfolded for use. When unrolled or unfolded, the display 20 may have a size similar to a small tablet computer, and therefore the power requirements for operation of such a display 20 may be similar to that of a small tablet computer.

Whilst the below described embodiments relate to a mobile device 10, it will be understood that the apparatus may, in some embodiments, be a non-mobile device, that is, a fixed device, where such a fixed device is battery powered and/or has limited charging capabilities. In one example, such a fixed device may comprise a battery, for providing power to the fixed device, which is charged via an associated solar panel array. In such a fixed device arrangement, power consumption may still be an issue to which the below described arrangements can be provided to alleviate power consumption issues.

In FIG. 1, the mobile device 10 comprises processing means in the form of processing circuitry or a processor 30 which is operable to carry out the below described methods in order to optimise the operation of the mobile device 10. The processor 30 may be a graphics processor, or graphics processing unit (GPU) or may comprise a graphics processor or GPU along with other processing circuitry. The processor 30 is connected to a non-transitory computer readable storage medium, for example a memory 40, which may be in the form of storage circuitry, configured to store computer code comprising instructions which when implemented on the processor 30 causes the processor 30 to carry out some, or all, of the below described methods. The memory 40 may comprise non-volatile storage, such as a flash memory, and/or volatile storage, such as a cache memory allowing high-speed data access. The memory 40 may store user data and device data, where the device data may comprise data relating to the display 20, such as display size, maximum resolution, and maximum refresh rate.

The mobile device 10 may comprise a camera 50, which camera 50 is positioned on the same side of the mobile device 10 as the display 20. The camera 50 may be used to provide image capture of the environment of the mobile device 10 and be directly or indirectly coupled to the processor 30, in order for the processor 30 to carry out one or more of the functions of detecting the presence of a user, determining the identity of the user, determining the attention of the user relative to the display 20, tracking the eyes of the user, determining motion of the user, and determining the distance of the user from the display 20.

The mobile device 10 may comprise further elements, for example, one or more of an ambient light level sensor 70, a depth sensor 60, a stereo imaging sensor, accelerometers 80, an inertial measurement unit, a global positioning system (GPS) transceiver, gyroscopes, and communication circuitry for communicating with other devices such as a server. The mobile device 10 may comprise a mono imaging sensor, where the output of the mono imaging sensor is processed by a mono depth neural network executing on a processor. Depth sensors 60 may include time of flight sensors, including lidar, radar and acoustic sensors, or structural light sensors which provide a structured dot pattern that changes when the environment upon which the structured dot patters is projected changes. A mono imaging sensor, where the output of the mono imaging sensor is processed by a mono depth neural network, or a stereo imaging sensor, where the output of the stereo imaging sensor is processed to determine stereo disparity, may alternatively be used to provide depth information. The camera 50 and/or depth sensors 60 may provide a wide angle of detection to ensure appropriate detection of a user who is positioned in front of the mobile device 10. The function of various of these elements is explained further below with regards to various methods of operating a mobile device 10.

The method 200 of operation of the mobile device 10 is described in the following paragraphs with reference to FIG. 2, and is described in relation to modifying a first image parameter dependent upon a determined distance between the display 20 and a user of the mobile device 10. The first image parameter may also be considered to be an image rendering parameter or an image characteristic, and is a parameter or characteristic of the image to be displayed on the display 20. The first image parameter may relate to the image resolution, image compression, image brightness, anti-aliasing, refresh rate or variable rate shading. The first image parameter may be a function of the size of the display 20, where a larger display 20 requires, for example, a larger resolution to ensure that separate pixels in an image are not readily discernible by the user.

It will be understood that the steps of the method 200 may be repeated for further image parameter modification. For example, the method 200 may be carried out periodically to ensure the first image parameter is appropriate considering the environment of the mobile device 10. When a user moves closer to the display 20 or further away from the display 20, the first image parameter may require modification from a current value to ensure optimisation of the operation of the mobile device 10.

At block 205 a first image parameter is identified for an image to be displayed on the display 20 of the mobile device 10. Identifying the image parameter for an image to be displayed on a display 20 of the mobile device 10 may comprise receiving, at an operating system running on the processor 30 of the mobile device 10, an image parameter value from an application running on the mobile device 10. The application may require a specific image parameter value, such as an image resolution, for displaying image data. The application may require a particular refresh rate for images to be displayed on the display 20 of the mobile device 10, depending on the content type to be displayed on the display 20. A gaming application is likely to require a higher value of frames per second (FPS) than a book reader application. Modification of the first image parameter, such as the refresh rate, may be limited to a minimum value that the user would perceive to be acceptable for the given application.

At block 210 a distance between the display of the mobile device and a user of the mobile device is determined.

At block 215 the first image parameter is modified dependent upon the determined distance between the display of the mobile device and the user of the mobile device.

At block 220 an image is rendered or displayed on the display using the modified first image parameter. The rendering of the image is therefore dependent upon the modified first image parameter.

When the user moves further away from the display 20 of the mobile device 10, then the first image parameter may be modified to carry out one or more of reducing the image resolution, increasing image compression, decreasing image brightness, decreasing the level of anti-aliasing and decreasing the display refresh rate, thereby reducing power consumption of the mobile device 10 without substantially affecting the image quality perceived by the user. Some GPU cores may be disabled depending on the resolution and/or refresh rate that is required, or all of the cores can be enabled with the clock rate being reduced to maintain the desired resolution and/or refresh rate whilst reducing power consumption.

In an example, the first image parameter may be a resolution of the image to be rendered or displayed on the display 20. The distance between the display 20 of the mobile device 10 and the user of the mobile device 10 may be determined by operation of a sensor 60, such as a depth sensor or an imaging sensor, on the mobile device 10. In some embodiments a front facing camera 50 may be operable to determine the distance between the display 20 of the mobile device 10 and the user of the mobile device 10, for example by operating as a mono imaging sensor with a mono depth neural network. Alternatively, a determination of inter pupilar distance, that is, the distance between the centres of the two eyes of a user, can be used to determine the distance between the display 20 of the mobile device 10 and the user of the mobile device 10.

In alternative embodiments stereo imaging from a plurality of front facing cameras on the mobile device 10 can be used to determine the distance between the display 20 of the mobile device 10 and the user of the mobile device 10.

In other embodiments a depth sensor 60 separate to the camera 50 can be used to determine the distance between the display 20 of the mobile device 10 and the user of the mobile device 10. Such depth sensors 60 may be time-of-flight sensors, such as a lidar, a radar, or an acoustic sensor. Other types of depth sensors 60 could also be used, such as structural light sensors which provide a structured dot pattern projected into the environment that changes when the environment upon which the structured dot pattern is projected changes.

In another example, the first image parameter may be a level of anti-aliasing (e.g. multisample anti-aliasing, supersampling anti-aliasing, temporal anti-aliasing) applied to the image to be rendered or displayed on the display 20, where the level of anti-aliasing may be 2× meaning that the image is rendered at twice the desired resolution before downsampling to reduce jagged lines in the images, 4× meaning the image is rendered at four times the desired resolution before downsampling, or 8× meaning the image is rendered at eight times the desired resolution before downsampling. At greater distances between the display 20 of the mobile device 10 and the user of the mobile device, lower levels of anti-aliasing can be applied, or anti-aliasing can be turned off entirely to reduce processing burden. Although an application may call for a certain level of anti-aliasing, the present method can override the instructions of the application with a call to a graphics driver to cancel anti-aliasing in order to save resources.

Figure 2:
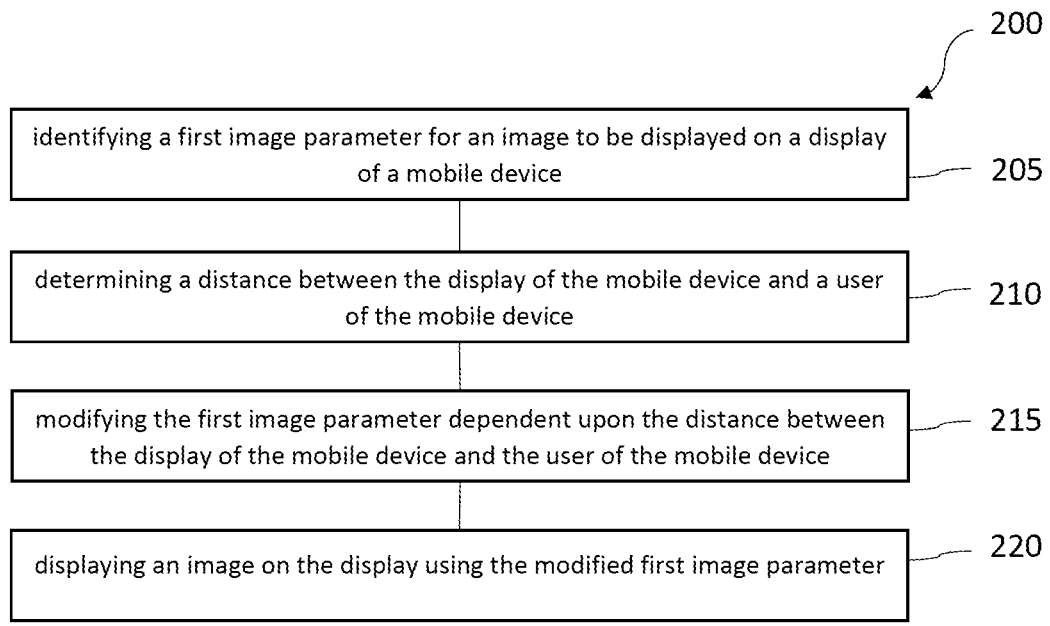
FIG. 2 illustrates a flow diagram of blocks of a method according to various examples.
Figure 3:
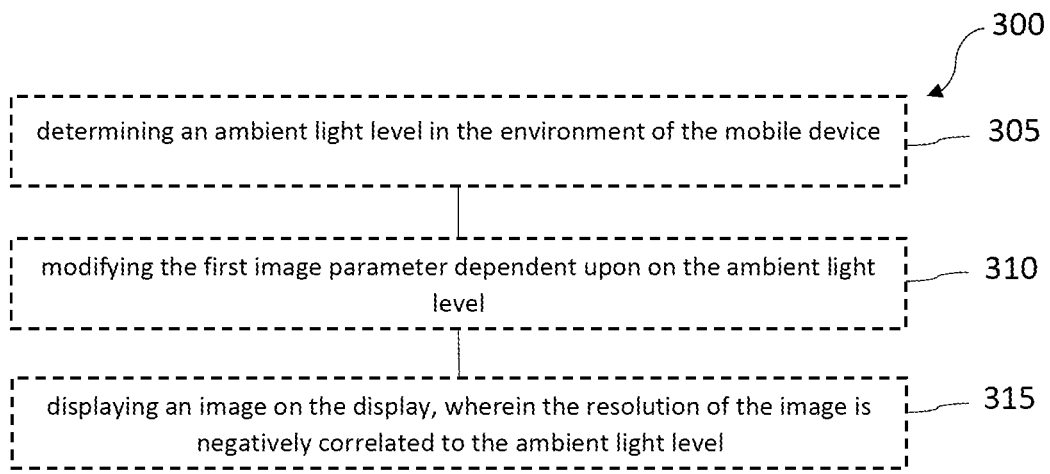
FIG. 3 illustrates a flow diagram of blocks of a method according to various examples.

FIG. 3 illustrates features of a method 300 for the operation of the mobile device 10, where the first image parameter may be further modified over the method 200 shown in FIG. 2, to modify the operation of the mobile device 10 with regards to an ambient light level, that is, the lighting conditions in which the mobile device 10 is being operated. In an outdoor environment the display 20 of the mobile device 10 may appear washed out, that is, images viewed on the display 20 by the user may be perceived to have a low contrast and/or image saturation, since the display 20 may have a dynamic range much lower than can be perceived by the user in the general outdoor environment. The display may therefore be difficult for the user to view with accuracy.

In block 305 an ambient light level in the environment of the mobile device is determined. In order to detect the ambient light level and changes in the ambient light level, a light level sensor 70 such as a photoelectric device, for example in the form of a photoresistor or photodiode, may be provided on the mobile device 10 to obtain a measurement of the light levels in the environment of the mobile device 10. Preferably the light level sensor 70 is positioned on the same side of the mobile device 10 as the display 20 in order to ascertain the level of light impinging on the display 20.

In alternative embodiments, the camera 50 may be used to determine an ambient light level value, that is, to act as a light level sensing arrangement. Analysis of parameters such as the contrast, the brightness and the colour saturation values for an image taken by the camera 50 may be used to determine the ambient light level value. Alternatively, or in addition, the presence of well defined shadows in the image taken by the camera 50 may be used to determine a high ambient light level, in other words to indicate the presence of bright environmental conditions.

In further alternatives also using the camera 50 to determine an ambient light level value, images of the user can be captured and analysed to determine the ambient light level, for example by detecting the pupil size of the user's eyes, where a smaller pupil size indicates brighter environmental conditions, or by determining if the user is wearing sunglasses potentially indicating bright environmental conditions. Additionally, the detection or determination of the user wearing sunglasses can be used as an additional parameter to modify the first image parameter. The wearing of sunglasses impairs the users vision since the sunglasses will attenuate the output of the display 20, especially when in bright environmental conditions. Therefore, the image can be rendered or displayed on the display 20 at a lower quality, that is, with a lower resolution or with higher image compression.

In block 310 the first image parameter is modified dependent upon on the detected ambient light level. When the ambient light level is high then it may be more difficult to discern detail on the display 20, for example because of a decrease in perceived contrast in the displayed image. Since it is more difficult to discern detail on the display 20 it is possible to modify the first image parameter to reduce the processing and power consumption burden on the mobile device 10, for example by lowering the displayed image resolution. In some embodiments the user can change the level of modification of the first image parameter that is applied under different ambient light conditions as required by altering settings of the mobile device 10. Some users are more tolerant to increases in ambient light levels and such users may wish to reduce the level of modification of the first image parameter, to avoid the image quality being reduced below a user acceptable level.

At block 315 an image is displayed on the display 20. When the first image parameter is a resolution of the image to be rendered or displayed on the display 20, the resolution can be reduced without detrimentally affecting the user's experience. The resolution of the image has a negative correlation to the ambient light level, that is, the resolution of the image is negatively correlated to the ambient light level, such that as the ambient light level increases, the resolution decreases, and as the ambient light level decreases, the resolution increases, up to a resolution identified for the image to be displayed on the display 20 of the mobile device 10, for example a resolution required by or commanded by a specific application running on the mobile device 10.

Figure 4:
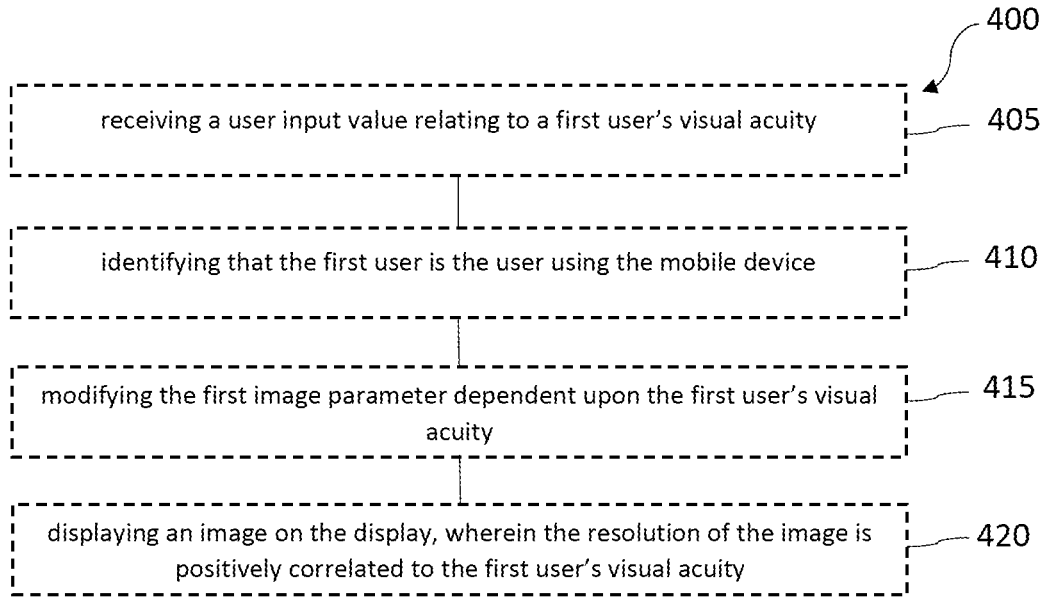
FIG. 4 illustrates a flow diagram of blocks of a method according to various examples.

FIG. 4 illustrates features of a method 400 for the operation of the mobile device 10, where the first image parameter may be further modified over the method 200 shown in FIG. 2, to modify the operation of the mobile device 10, with regards to the user's visual acuity.

For a user to be able to discern adjacent pixels on a display 20 the adjacent pixel separation must be at a smaller angular distance than the angular resolution of the user's eye. For a user with perfect visual acuity, that is, a user with no vision impairment, the angular resolution of the user's eye is one arc minute or $\frac{1}{60}^{th}$ of a degree, with near perfect visual acuity still having an angular resolution of two arc minutes or $\frac{1}{30}^{th}$ of a degree. Thus, the ability of a user to discern separate pixels on the display 20 depends not only on the image resolution, but the size of the display 20 and the distance the user is away from the display 20.

A larger display 20 requires a larger resolution to ensure that separate pixels are not discernible. A value of pixel density of the display 20 therefore needs to be considered, where the pixel density is often provided as a value in pixels per inch (PPI), that is, the number of physical pixels per inch on the display 20. It is therefore possible to determine a required pixel density for a display 20, such that the user of the display 20 positioned at a given distance from the display 20 cannot discern between adjacent pixels. For example, an angular resolution of one arc minute for a user at twenty five centimetres from a display corresponds to 350 PPI. Higher pixel density means more pixels to be rendered by the mobile device 10 and consequently higher power consumption. Presently, some mobile devices have pixel densities above 350 PPI, for example the Samsung Galaxy Z Flip which has a pixel density of 425 PPI.

A user with visual acuity which is not perfect will not be able to discern pixels as easily as a user with perfect visual acuity and therefore images may be rendered or displayed on the display 20 for a user with visual acuity which is not perfect for which the user cannot appreciate the image quality. In such circumstances processing and power consumption can be optimised by modifying the first image parameter, which may for example be the image resolution, to reduce the processing and power consumption burden when displaying images on the display 20.

In block 405 a user input value relating to a first user's visual acuity is received. This may be provided for and/or by the first user as a parameter or set of parameters in the settings of the mobile device 10, for example, when initially setting up the mobile device 10. The user may provide data, in the form of an eye prescription or other visual acuity data, which the mobile device 10 can access in order to modify a first image parameter for an image to be displayed on the display 20 of the mobile device 10. The user input data may be stored in a memory 40 of the mobile device 10 or be stored remotely from the mobile device 10, accessible via communication circuitry of the mobile device 10.

In block 410 the first user is identified as the user using the mobile device, that is, the user for which the user input value of visual acuity has been received.

In block 415 the first image parameter is modified dependent upon the first user's visual acuity. In some embodiments the first image parameter will be an image resolution, though in other embodiments this may be other image quality values, such as an image compression value or an anti-aliasing value.

In block 420 an image is displayed on the display. Where the first image parameter relates to image resolution, the resolution of the image has a positive correlation to the first user's visual acuity, that is, the resolution of the image is positively correlated to the first user's visual acuity. Therefore, the image is displayed with a lower resolution when the user input value relating to the user's visual acuity indicates a vision impairment, and higher resolution when the user's vision is not impaired. Thus, the resolution of the displayed image can be reduced if it is determined that the user could not readily discern pixels in a higher resolution image, thereby reducing processing burden and power consumption burden for the mobile device 10.

Where it is known that the user does not have perfect visual acuity, the capability of any correction or correcting lenses associated with the user may be known. Where a user does not have perfect visual acuity it may be determined whether or not the user is wearing correcting lenses. If the user is determined to not be wearing correcting lenses, then the first image parameter may be modified as appropriate for the user's uncorrected visual acuity, and if the user is determined to be wearing correcting lenses the first image parameter may be modified as appropriate considering the correcting lenses being used. Where a user has a number of different correcting lenses, the correcting lenses being used by the user may be identified using computer vision and the user's visual acuity given the correcting lenses being used may be determined. If there are multiple users viewing the display 20, from the same distance, the first image parameter may be optimised for the user with the best visual acuity, factoring in any correcting lenses.

Figure 5:
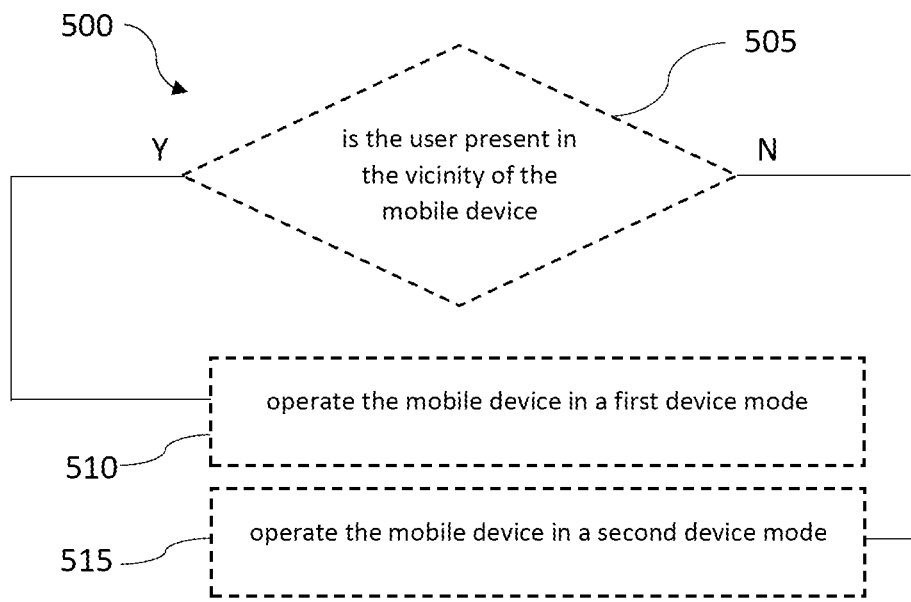
FIG. 5 illustrates a flow diagram of blocks of a method according to various examples.

FIG. 5 illustrates features of a method 500 for the operation of the mobile device 10, where the operation of the mobile device 10 can be modified, dependent on the detected presence of a user, over the method 200 shown in FIG. 2. In alternative embodiments, the method 500 of FIG. 5 may be provided without the features of the method 200 of FIG. 2.

In block 505 it is determined if the user is present in the vicinity of the mobile device 10. The presence of the user may be determined by operation of a camera 50 on the mobile device 10. The camera may be a forward-facing camera 50, operable to detect the presence of a user when the user is in the field of view of the camera 50 or when the user is determined to be looking at the display 20 of the mobile device 10. The user may be determined to not be present when the determination of a distance between the display 20 of mobile device 10 and user of mobile device 10 is not calculable, for instance when the user is not in the field of view of a forward-facing camera 50 of the mobile device 10.

An alternative method of determining if a user is present in the vicinity of the mobile device 10 can be provided, such as via the detection of a communication connection between a user worn device, such as a watch or smart glasses, and the mobile device 10, where the communication connection is maintained via short-range or very short-range communications, such as Bluetooth or Zigbee connection. When a communication connection is maintained between the user worn device and the mobile device 10, it is determined that the user is present in the vicinity of the mobile device 10.

A further alternative method of determining if a user is present in the vicinity of the mobile device 10 can be provided by using a depth sensor 60 in place of the camera 50. By using a depth sensor 60 a user can be tracked in front of the mobile device 10 with less processing burden than would be required by capturing and analysing image data from the camera 50, as the depth sensor 60 is of lower resolution. A depth sensor 60 may also provide easier separation of objects than provided through image analysis, in particular the separation of a user's face from a background, such as a wall.

Depth sensor data from the depth sensor 60 and image data from the camera 50 may be used separately. For example, the depth sensor 60 may be used to detect or indicate a change in the detection of a user, following which the image camera 50 can be used for face detection and/or facial recognition, where face detection determined that there is a face in the imaged area in front of the mobile device 10 and facial recognition attempts to determine who the user is from the image data. In some embodiments, the depth sensor 60 and the camera 50 may be used simultaneously to perform facial detection and/or recognition.

Optical flow algorithms can be used to analyse the output of a camera 50 on the mobile device 10 and/or output of a depth sensor 60 on the mobile device 10, to determine how the user moves between data captures by the camera 50 and/or depth sensor 60.

If the user is determined to be present in the vicinity of the mobile device 10, then the mobile device 10 is operated in a first device mode, as in block 510. If the user is determined to not be present in the vicinity of the mobile device 10, then the mobile device 10 is operated in a second device mode, different to the first device mode, as in block 515.

The first device mode may be a mode whereby an operation of the mobile device 10 is unhindered, and the second device mode may be a mode whereby an operation of the mobile device 10 is hindered in some way, such as by pausing or preventing the operation of the mobile device 10 or a function of the mobile device 10. In some embodiments, when in the second device mode the display 20 is locked and the mobile device 10 enters an idle mode, such that the processor 30 minimises its power consumption. Where the processing is divided between a central processing unit (CPU) and a GPU, both the CPU and the GPU minimise their power consumption in the second device mode.

In one embodiment, where the operation of the mobile device 10 comprises streaming of audio and video data, the second device mode is intended to pause or stop the streaming operation of the mobile device 10, when the user is not present, or to stop or modify the rendering of the video component of the streaming data whilst maintaining streaming of the audio component of the streaming data. Modifying the rendering of the video component of the streaming data may comprise one or more of reducing the resolution of the image, reducing the frame rate or refresh rate for the video component, reducing image brightness, reducing anti-aliasing of the image, and increasing image compression.

When in the second device mode, the mobile device 10 may periodically monitor for the user being present in the vicinity of the mobile device 10. In one embodiment, where the mobile device 10 comprises a depth sensor 60, if the depth sensor 60 determines that there has been a significant change in the depth sensor reading, face detection and/or facial recognition may be performed on the output of the camera 50 to determine if the user is still using the mobile device 10 and/or which user is using the mobile device 10. Alternatively, periodic capture and analysis of an image from the camera 50 on the mobile device 10 can be carried out to determine if the user is still in the vicinity of the mobile device 10. If the user does become present in the vicinity of the mobile device 10 then the mobile device 10 is switched to operate in the first device mode.

Figure 6:
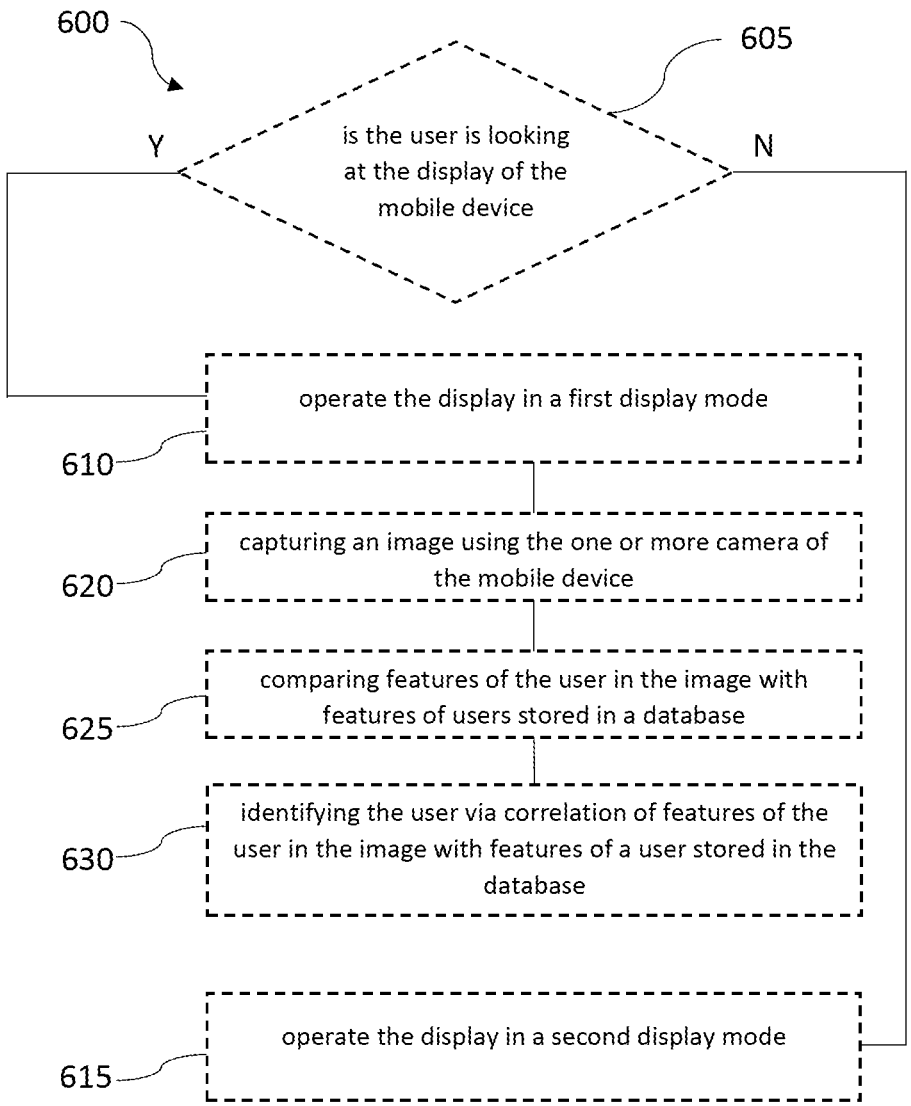
FIG. 6 illustrates a flow diagram of blocks of a method according to various examples.

FIG. 6 illustrates features of a method 600 for the operation of the mobile device 10, where the operation of the mobile device 10 can be modified, dependent on the detection of user attention to the display 20, over the method 200 shown in FIG. 2. In alternative embodiments, the method 600 of FIG. 6 may be provided without the features of the method 200 of FIG. 2.

In block 605 it is determined whether the user is looking at the display 20 of the mobile device 10. The determination of whether the user is looking at the display 20 of the mobile device 10 may be provided via one or more camera 50 of the mobile device 10, the one or more camera 50 being on the same side of the mobile device 10 as the display 20.

Detecting if a user is looking at the display 20 of the mobile device 10 may comprise detecting if the user is in the field of view or frame of the captured image from the camera 50.

Different forms of face detection can be applied to the images captured by the camera 50. For example, Machine-learning face detection can be applied, or simpler non-machine-learning face detection can be applied. Machine-learning face detection may be able to detect a face which is only partially captured by the camera 50, but requires greater processing than for non-machine-learning. Simpler face detection, such as by the use of the non-machine-learning Viola-Jones face detection, often requires less processing but may require the user's full face to be in view of the camera 50, and often be directly facing the camera 50.

Alternatively, detecting if a user is looking at the display 20 of the mobile device 10 may comprise detecting a directional gaze of the user over a predetermined period of time. The directional gaze of the user may be determined by eye-tracking as will be described further below in relation to FIG. 7.

In some embodiments, the front-facing camera 50 may operate in an always on condition, in particular when user tracking and eye tracking is required, though may run at relatively low frame rates to reduce the processing burden unless eye-tracking is being carried out for an application running at a high refresh rate, such as a gaming application. The condition of the camera 50 being in an always on condition may be selected or deselected by the user when an application is running on the mobile device 10. The always on condition of the camera 50 may be locked to a particular application, such that other applications do not necessarily have access to the camera 50.

If the directional gaze of the user is determined to be focusing on the display 20 for a predetermined period of time or for a proportion of time over a predetermined period of time, then it can be concluded that the user is looking at the display 20.

If it is determined that the user is looking at the display 20 of the mobile device 10, then the display will be operated in a first display mode as in block 610. In the first mode the display 20 is generated or updated in accordance with a first set of parameters.

If it is determined that the user is not looking at the display 20 of the mobile device 10, then the display will be operated in a second display mode as in block 615, where the second display mode is different from the first display mode. In the second mode the display is generated or updated in accordance with a second set of parameters different from the first set of parameters. The second set of parameters may include one or more of a reduced resolution, a reduced frame rate, reduced brightness, reduced anti-aliasing, and increased image compression. The transition from the first display mode to the second display mode may be gradual, rather than abrupt, in order to avoid causing a user who does not presently have their attention on the display 20 to return their attention to the display 50. The user may still be detected in front of the mobile device 10, but may be determined to be looking away from the display 20, for example by detecting the user, but not being able to detect the eyes of the user in an image captured by the camera 50, or by detecting the directional gaze of the user, through eye tracking, to be away from the display 50.

The first display mode may be a mode whereby operation of the display 20 of the mobile device 10 is unhindered, and the second display mode may be a mode whereby an operation of the display 20 of the mobile device 10 is hindered in some way, such as by pausing or preventing the operation of the display 20 of the mobile device 10 or modifying the operation of the display 20 of the mobile device 10.

In one embodiment, where the mobile device 10 is streaming audio and video data, the second display mode may modify or stop the rendering of the video component of the streaming data whilst maintaining streaming of the audio component of the streaming data. Other modifications to the rendering of the video component can be provided, such as rendering image frames at a reduced resolution, increasing image compression, reducing anti-aliasing, reducing the frame rate for the video component being played, and reducing the display brightness. Since the user is not looking at the display 20 when the display 20 is operating in the second display mode, the operation of the display can be modified to reduce processing burden and/or power consumption of the mobile device 10 without significant impact on the perceived operability of the mobile device 10 by the user.

Optionally, further to the detection of whether the user is looking at the display 20 of the mobile device 10, user identification may also be carried out using the camera 50, in order to provide further modification of the operation of the mobile device 10. The user can be determined via facial recognition. Facial recognition may be based on a predetermined set of parameters for one or more users including the location, shape and size of identifiable facial features.

In block 620 an image is captured using the one or more camera 50 of the mobile device 10. The camera 50 is a front-facing camera, that is, a camera 50 on the same side of the mobile device 10 as the display 20, such that it can be detected if the user is looking at the display 20 of the mobile device 10.

In block 625 features of the user in the captured image are compared with features of users stored in a database. The database of users may be stored locally to the mobile device 10, for instance in the memory 40 of the mobile device 10, or stored remotely from the mobile device 10, for instance on a connected or connectable server. In an example, a neural network may be trained (or have been trained) to detect the user. Therefore, the user face features are determined by weights and connections in the neural network.

In block 630 the user may be identified via correlation of features of the user in the image with features of a user stored in the database. For example, facial features such as the separation of eyes, ears, nose, and mouth and the shape of such features, facial hair, skin colour and distinguishing marks, may be used to determine a user identity.

Once a user has been identified, the operation of the mobile device 10 can be modified based on the user identification. For example, user's eye prescription may be provided by data associated with the user identification, such that the first image parameter may be modified dependent upon the user's visual acuity, as described above in relation to FIG. 4, wherein, for example, the quality of the image, which may include the resolution of the image displayed on the display 20 is positively correlated to the user's visual acuity. When the user has been identified, parameters relating to the user's features can be used to determine how far away from the display 20 the user is, which can be used in the method of FIG. 2 to determine the distance between the display 20 of the mobile device 10 and a user of the mobile device 10. For example, the separation of the user's eyes, or the size of the user's head may be parameters known for the identified user and this can be correlated to the apparent separation of the user's eyes, or the apparent size of the user's head, in an image captured by the camera 50 to determine the distance between the user and the mobile device 10. The parameters know for an identified user may be provided during an initial calibration of the mobile device 10 for the user.

In one embodiment facial recognition may be carried out initially as described above to identify the user, then a simpler face detection routine, such as provided by block 605, can be carried out to determine whether the user is looking at the display 20 of the mobile device 10. The simple face detection routine may be carried out for a predetermined period of time ranging from seconds to minutes. Following the predetermined period of time facial recognition may be carried out again to determine if the same user is viewing the display 20, or whether the user has changed.

In another embodiment only face detection is used, and the method defaults to assuming user has perfect vision. Such an arrangement may also be used if facial recognition fails to determine the identity of the user, either because they are not calibrated for the mobile device 10, or if there has been an error in the recognition of a user who is identified in the database of users.

Figure 7:
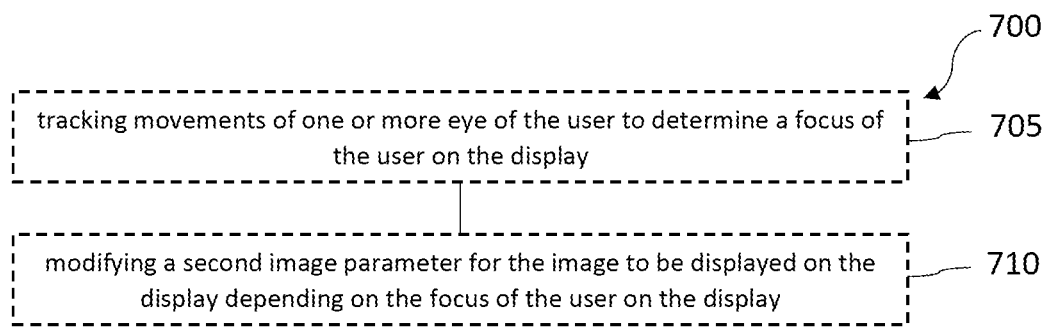
FIG. 7 illustrates a flow diagram of blocks of a method according to various examples.

Alternatively, or in addition to the function of identifying a user using a front-facing camera 50, the mobile device 10 can be configured to carry out eye tracking of the user as illustrated in FIG. 7, to determine the directional gaze of the user. Detecting the directional gaze of the user may comprise periodically analysing images of the user's face captured by the camera 50.

In FIG. 7, a method 700 of tracking the focus of a user on the display 20 is illustrated. In particular, it is illustrated in block 705 that the movements of one or more eye of the user can be tracked to determine a focus, or centre of interest, of the user on the display 20. In block 710 a second image parameter may be modified for the image to be displayed on the display 20 depending on the focus of the user on the display 20.

The second image parameter may be a variable rate shading parameter. Variable rate shading allows balancing between image quality and processing effort to be varied across a render output, such as an image frame for display on the display 20. In particular, variable rate shading allows the area of a render output, such as an image frame, that a single colour is sampled (rendered) for, that is, the shading rate, to vary within the render output. Thus, in variable rate shading, different shading rates can be used to render a render output such that, for example, in some places in the output a single sampled (rendered) colour is used for a single output pixel, whereas elsewhere in the output, the same single sampled (rendered) colour is used for each of plural output pixels in a block of plural output pixels, thereby reducing the processing effort for those pixels.

Sampling (rendering) a single colour and applying it to plural sampling points (e.g. pixels) will reduce the processing effort required for those sampling points, as compared to sampling an individual colour for each sampling point, but will usually come at the expense of reduced image quality.

There will typically be a set of plural possible different sized render output areas that a single colour (set of colour value data) can be sampled for. The smallest possible of these render output areas may be referred to as a fine pixel, and the other, larger render output areas may be referred to as coarse pixels.

Each fine pixel will typically be the same size and location as a pixel of the output display device. However, it is also possible for each fine pixel to effectively correspond to less than one pixel of the output display device, for example where downsampling is to be applied.

The area of each possible coarse pixel typically corresponds to a block of plural fine pixels. The different possible shading rates are then referred to in terms of the number of fine pixels that the shading rate corresponds to. For example, a 1×1 shading rate will signify the finest possible shading mode in which a single colour should be sampled for a single fine pixel, whereas a 2×2 shading rate will signify that a single colour should be sampled for an area corresponding to a block of 2×2 fine pixels. A graphics processor may typically support 1×1, 1×2, 2×1, 2×2, 2×4, 4×2 and 4×4 shading rates, for example.

By tracking the movements of one or more eye of the user to determine a focus, or centre of interest, of the user on the display 20, it can be determined which part of the display 20 the user is looking at and/or focusing on and then render that part of the display 20 with a higher resolution, that is, with fine pixels. The higher resolution area of the display 20 may be provided at a resolution which is the resolution which an application running on the mobile device 10 is requesting. The remainder of the display 20 can be provided at a lower resolution, that is, with coarse pixels, which then utilizes processing cycles more efficiently to reduce processor burden in forming an image frame.

A spot or area of higher resolution can be provided surrounding the focus, or centre of interest, of the user on the display 20, and an area of lower resolution can be provided surrounding the area of higher resolution. Further, in some embodiments, a transition region can be provided, so there is no hard border between the highest and lowest resolution areas to be displayed. Thus, fine pixels can be provided in the area of higher resolution, coarse pixels can be provided in the area of lower resolution, and intermediate pixels can be provided in the transition region, where the intermediate pixel size is between that of the fine pixels and the coarse pixels.

The spot or area size for the higher resolution rendering may be user definable, and may depend on user preference.

The spot or area size for the higher resolution rendering may vary dependent on the distance of the user from the display 20.

In one embodiment, as the distance of the user from the display 20 increases, the whole display 20 is configured to be rendered at a lower resolution, but the spot or area size for the higher resolution rendering increases due to the increased visual field of the user so that that part of the rendered image which is of a higher resolution than the lower resolution part of the image increases in relative size.

As the user increases in distance from the display 20, the accuracy of eye tracking may decrease, further requiring an increase in the spot or area size for the higher resolution rendering.

In some embodiments, variable rate shading may be used by an application on the mobile device 10 to optimise render output, such as an image frame, without knowledge of whether a user is present in the vicinity of the mobile device 10 or whether the user is looking at the display of the mobile device 10, and therefore where the user is visually focusing. For example, an application may have a foreground object and there may be mist covering the background objects. Therefore, the foreground object may be variable rate shaded with higher resolution than the background objects. It may then be determined that the user is a far away from the display 20, such that the variable rate shading level from the application can be combined with knowledge of the user location to reduce processing requirements and power requirements for the mobile device 10 even further. In some embodiments, if it is detected that the processor is about to start thermal throttling due to a high workload on the processor, then variable rate shading can be applied to reduce the intensity of processor activity until the thermal throttling is no longer required.

Figure 8:
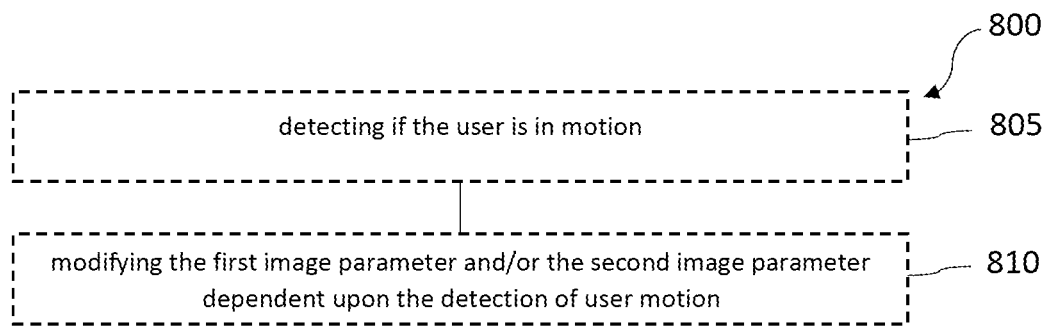
FIG. 8 illustrates a flow diagram of blocks of a method according to various examples.

FIG. 8 illustrates features of a method 800 for the operation of the mobile device 10, where the operation of the mobile device 10 can be modified, dependent on the detection of the motion of the user, over the method 200 shown in FIG. 2. In alternative embodiments, the method 800 of FIG. 8 may be provided without the features of the method 200 of FIG. 2.

In block 805 it is detected or determined if the user is in motion, in particular if the user is walking or running. If in motion, the user is more likely to be less able to directly focus on screen. The detection of whether the user in in motion can be provided by the use of one or more accelerometers 80 or an inertial measurement unit, on board the mobile device 10, where the accelerometers 80, or inertial measurement unit, detect the movement of the mobile device 10, where the movement of the user can either be considered to be consistent with the movement of the mobile device 10 or be extrapolated from the movement of the mobile device 10.

Alternatively, the movement of the user can be detected or determined by the identification of movement of the user and/or the background in images captured by a camera 50 on the mobile device 10.

In further alternatives, a GPS transceiver can be used in pace of or in conjunction with the accelerometers 80 or an inertial measurement unit to determine if the user is in motion, again where the movement of the user can either be considered to be consistent with the movement of the mobile device 10 or be extrapolated from the movement of the mobile device 10.

Simultaneous Location and Mapping (SLAM) can be used to combine output from accelerometers 80, an inertial measurement unit, or a combination thereof, along with output in the form of image data from a camera 50, in order to accurately detect the movement of the user in the environment. Further, output from a GPS transceiver may be used alongside SLAM to detect the movement of a user in an environment.

In block 810 the first image parameter and/or the second image parameter is modified dependent upon the detection of user motion. The extent of the modification of the first image parameter and/or the second image parameter due to the detection of user motion is dependent upon the extent of the detected user motion.

If in motion, the user is more likely to be less able to directly focus on the display 20 such that the first image parameter and/or the second image parameter can be modified to reduce processing burden by one or more of reducing resolution of the image, reducing frame rate, reducing image brightness, reducing anti-aliasing, increasing image compression, and increasing variable rate shading to provide more coarse pixels.

Figure 9:
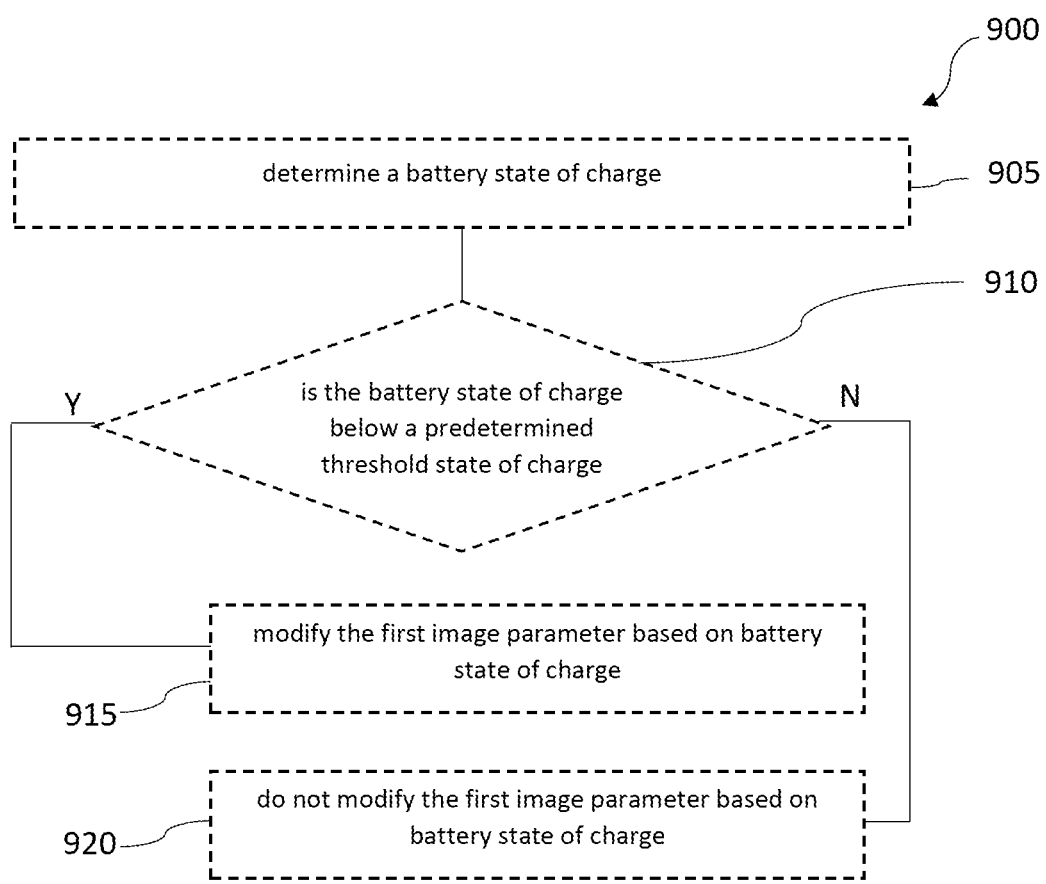
FIG. 9 illustrates a flow diagram of blocks of a method according to various examples.

FIG. 9 illustrates features of a method 900 for the operation of the mobile device 10, where the operation of the mobile device 10 can be modified, dependent on the battery state of charge for the mobile device 10, over the method 200 shown in FIG. 2. In alternative embodiments, the method 900 of FIG. 9 may be provided without the features of the method 200 of FIG. 2.

In block 905 a battery state of charge is determined. In block 910 the battery state of charge is compared to a predetermined threshold state of charge. The predetermined threshold state of charge may be user set or defined by an application running on the mobile device 10. The predetermined threshold may be stored in the memory 40 of the mobile device 10.

If the battery state of charge is determined to be below the predetermined threshold state of charge, as illustrated in block 915, then the first image parameter is modified as a result of the determined state of charge of the battery.

If the battery state of charge is determined to be above the predetermined threshold state of charge, as illustrated in block 920, then the first image parameter is not modified as a result of the determined state of charge of the battery.

In some embodiments, more than one predetermined threshold state of charge can be provided, with each predetermined threshold state of charge having an associated modification of the first image parameter, such that as the battery state of charge reduces, the quality of the images on the display 20 correspondingly reduces, by, for example, one or more of the reduction of the image resolution, reduction of the frame rate or refresh rate, reduction of the image brightness, reduction of the anti-aliasing, and increase in the image compression, thereby reducing energy consumption, and effectively extending battery life.

Although embodiments have been described where a user of the mobile device 10 is detected and/or identified, when there are two users looking at the display 20 of the mobile device 10, a decision may need to be made as to which user is to be identified as a prime user of the mobile device 10. In one embodiment, identification of the closest user to the device may be the determining factor as to which user is the prime user of the mobile device. Alternatively facial recognition can be carried out on all detected users and the prime user can be a user who is identified as such in the database for that particular mobile device 10.

In another embodiment different users may have different visual acuity, and the highest visual acuity of the identified users can be chosen such that the images rendered or displayed on the display 20 can be optimised.

In some embodiments where multiple users are looking at the display 20, eye tracking of multiple users can be carried out to identify the focus of each user and to adjust one or more of the resolution, compression, and anti-aliasing of those areas accordingly.

In other embodiments, when multiple users are detected and/or identified, eye tracking can be disabled to minimise the processing burden and therefore power consumption of the mobile device 10, whilst providing a simpler global adjustment of the image parameters, for example by identifying the distance between the display 20 of the mobile device 10 and the closest user of the mobile device 10.

It will be understood that the blocks of the methods described herein may be repeated for continuous modification of the first image parameter and/or second image parameter and that some of the blocks of the method may be omitted or performed in a different order to that of the above-described examples. It will be understood that the blocks of the various methods shown in FIGS. 2 to 9 may be combined in various arrangements to provide combined effects on the first image parameter and/or the second image parameter in order to optimise the operation of the mobile device 10.

As will be appreciated by one skilled in the art, the present techniques may be embodied as an apparatus, a method or a computer program product. Accordingly, the present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium.

The computer readable storage medium may be a non-transitory computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

The program code may execute entirely on the mobile device, partly on the mobile device and partly on a remote device or entirely on the remote device or server. In the latter scenario, the remote device may be connected to the mobile device through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a hardware descriptor language, which may be stored and transmitted using fixed or transmittable carrier media.

In an alternative, an embodiment of the present techniques may be realized in the form of a data carrier having functional data thereon, said functional data comprising functional computer data structures to, when loaded into a computer system or network and operated upon thereby, enable said computer system to perform some or all the steps of the method.

It will be clear to one skilled in the art that many improvements and modifications can be made to the foregoing exemplary embodiments without departing from the scope of the present techniques.

The invention claimed is:

1. A method of operating a mobile device, the method comprising:
   identifying a first image parameter for an image to be displayed on a display of the mobile device, wherein the first image parameter relates to image resolution, image compression, image brightness, anti-aliasing, refresh rate, or variable rate shading;
   determining a distance between the display of the mobile device and a user of the mobile device;
   modifying the first image parameter dependent upon the distance between the display of the mobile device and the user of the mobile device; and
   displaying an image on the display using the modified first image parameter to reduce a processing load and power consumption of the mobile device by reducing image resolution and to ensure that pixels on the display are not readily discernable by the user irrespective of the distance between the display and the user.

2. A method of operating a mobile device according to claim 1, the method comprising:
   rendering the image to be displayed on the display based on the modified first image parameter.

3. A method of operating a mobile device according to claim 1, the method comprising:
   determining an ambient light level in the environment of the mobile device; and
   modifying the first image parameter dependent upon on the ambient light level.

4. A method of operating a mobile device according to claim 3, the method comprising:
   displaying an image on the display, wherein the resolution of the image is negatively correlated to the ambient light level.

5. A method of operating a mobile device according to claim 1, the method comprising:
   receiving a user input value relating to a first user's visual acuity;
   identifying that the first user is the user using the mobile device; and
   modifying the first image parameter dependent upon the first user's visual acuity.

6. A method of operating a mobile device according to claim 5, the method comprising:

displaying an image on the display, wherein the resolution of the image is positively correlated to the first user's visual acuity.

7. A method of operating a mobile device according to claim 1, the method comprising:

determining the distance between the display of the mobile device and the user of the mobile device by operation of a sensor on the mobile device.

8. A method of operating a mobile device according to claim 7, wherein the sensor is one of:

a depth sensor, where the depth sensor is one of a lidar, a structured light sensor, or a time-of-flight sensor;

a stereo imaging sensor using stereo disparity processing to determine depth;

a mono imaging sensor using mono depth neural network processing to determine depth or using a determination of inter pupilar distance.

9. A method of operating a mobile device according to claim 1, the method comprising:

determining if the user is present in the vicinity of the mobile device;

operating the mobile device in a first device mode when the user is present in the vicinity of the mobile device; and operating the mobile device in a second device mode, different to the first device mode, when the user is not present in the vicinity of the mobile device.

10. A method of operating a mobile device according to claim 1, the method comprising:

determining if the user is looking at the display of the mobile device using one or more camera of the mobile device, the one or more camera being on the same side of the mobile device as the display;

operating the display in a first display mode when the user is looking at the display; and operating the display in a second display mode, different to the first display mode, when the user is not looking at the display.

11. A method of operating a mobile device according to claim 10, the method comprising:

capturing an image using the one or more camera of the mobile device;

comparing features of the user in the image with features of users stored in a database; and identifying the user via correlation of features of the user in the image with features of a user stored in the database.

12. A method of operating a mobile device according to claim 1, the method comprising:

tracking movements of one or more eye of the user to determine a focus of the user on the display.

13. A method of operating a mobile device according to claim 12, the method comprising:

modifying a second image parameter for the image to be displayed on the display depending on the focus of the user on the display.

14. A method of operating a mobile device according to claim 13, wherein the second image parameter is a variable rate shading parameter.

15. A method of operating a mobile device according to claim 1, the method comprising:

detecting if the user is in motion; and modifying the first image parameter dependent upon the detection of user motion.

16. A method of operating a mobile device according to claim 13, the method comprising:

detecting if the user is in motion; and modifying the second image parameter dependent upon the detection of user motion.

17. A method of operating a mobile device according to claim 1, the method comprising:

determining a battery state of charge;

comparing the battery state of charge to a predetermined threshold state of charge; and if the battery state of charge is below the predetermined threshold state of charge, modifying the first image parameter.

18. A non-transitory computer readable storage medium comprising code which when implemented on a processor causes the processor to carry out the method of claim 1.

19. A mobile device comprising:

a display; and a processor, wherein the processor is configured to:

identify a first image parameter for an image to be displayed on the display of the mobile device, wherein the first image parameter relates to image resolution, image compression, image brightness, anti-aliasing, refresh rate, or variable rate shading;

determine a distance between the display of the mobile device and a user of the mobile device;

modify the first image parameter dependent upon the distance between the display of the mobile device and the user of the mobile device; and display an image on the display using the modified first image parameter to reduce a processing load and power consumption of the mobile device by reducing image resolution and to ensure that pixels on the display are not readily discernable by the user irrespective of the distance between the display and the user.

* * * * *